(12) United States Patent
Hanaoka et al.

(10) Patent No.: US 7,257,877 B2
(45) Date of Patent: Aug. 21, 2007

(54) GRATING FORMING METHOD AND MANUFACTURING METHOD FOR MASTER MEMBER FOR MANUFACTURING MOLDING DIE

(75) Inventors: Masashi Hanaoka, Nagano (JP); Kenichi Hayashi, Nagano (JP); Minoru Yamamoto, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 180 days.

(21) Appl. No.: 10/876,912

(22) Filed: Jun. 25, 2004

(65) Prior Publication Data

US 2005/0025423 A1    Feb. 3, 2005

(30) Foreign Application Priority Data

Jun. 30, 2003  (JP)  ............................. 2003-187886
Sep. 24, 2003  (JP)  ............................. 2003-332384
Nov. 4, 2003  (JP)  ............................. 2003-374051

(51) Int. Cl.
*B23P 13/04* (2006.01)
*G02B 6/34* (2006.01)

(52) U.S. Cl. .......................................... 29/557; 385/37
(58) Field of Classification Search .................. 29/557, 29/558; 385/37
See application file for complete search history.

(56) References Cited

U.S. PATENT DOCUMENTS 4,889,418 A * 12/1989 Benjamin .................... 359/217
5,638,212 A * 6/1997 Meyers et al. .............. 359/569
6,590,709 B1 * 7/2003 Ori et al. ..................... 359/566

FOREIGN PATENT DOCUMENTS

| JP | 2000-387961 | 7/2002 |
| JP | 2001-086069 | 10/2002 |
| JP | 2001-299664 | 11/2002 |
| JP | 2002-083916 | 9/2003 |

\* cited by examiner

*Primary Examiner*—John C. Hong
(74) *Attorney, Agent, or Firm*—Reed Smith LLP

(57) ABSTRACT

A grating forming method for forming a fine grating with a grating period of at most 1 μm on a surface of a blank material including (1) feeding realatively a diamond cutting tool and the blank material in a groove extended direction while rotating the diamond cutting tool about the axial line and (2) cutting the surface of the blank material with a blade tip part of the diamond cutting tool to form the grooves while rotating and feeding the diamond cutting tool. When the fine grating with the grating period of "P" μm is formed and the feed amount per revolution of the diamond cutting tool is set to be "S" μm, the feed amount per revolution "S", with which the diamond cutting tool is fed in the groove extended direction while rotating the diamond cutting tool about the axial line, is set to satisfy the following conditional expression: $S<2.9P^3$. This conditional are expression is applied to a blank material, a molding die, a molded product, and a master member for manufacturing a molding die.

18 Claims, 10 Drawing Sheets

[Fig. 1]
(A)
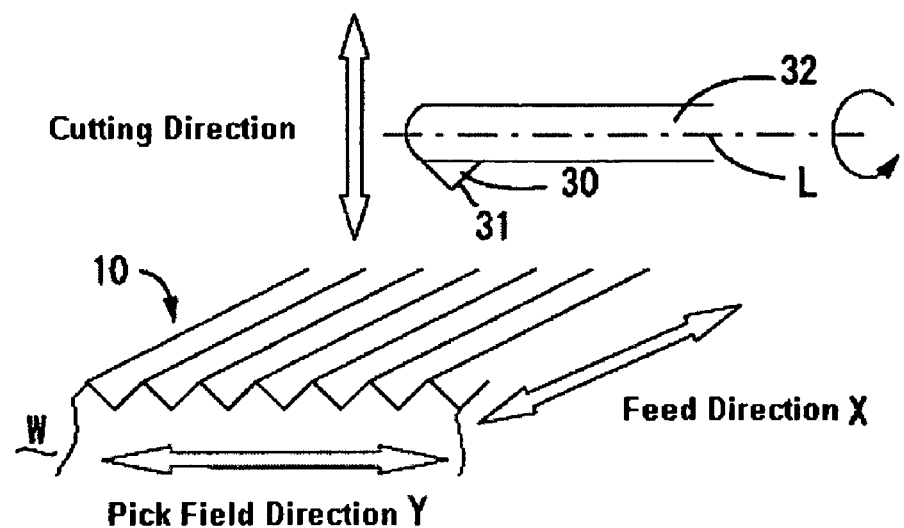
(B)
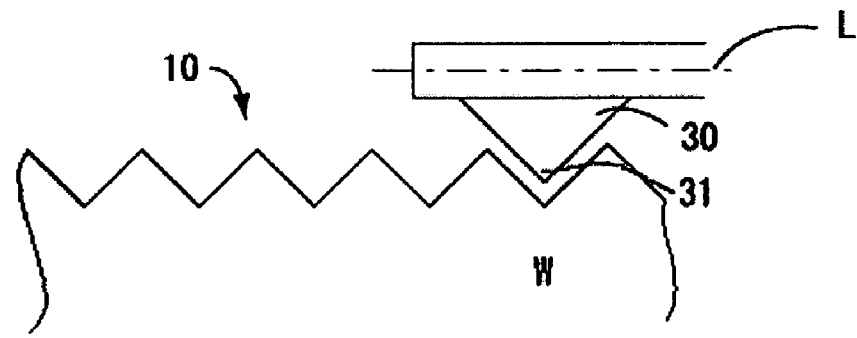

[Fig.2]
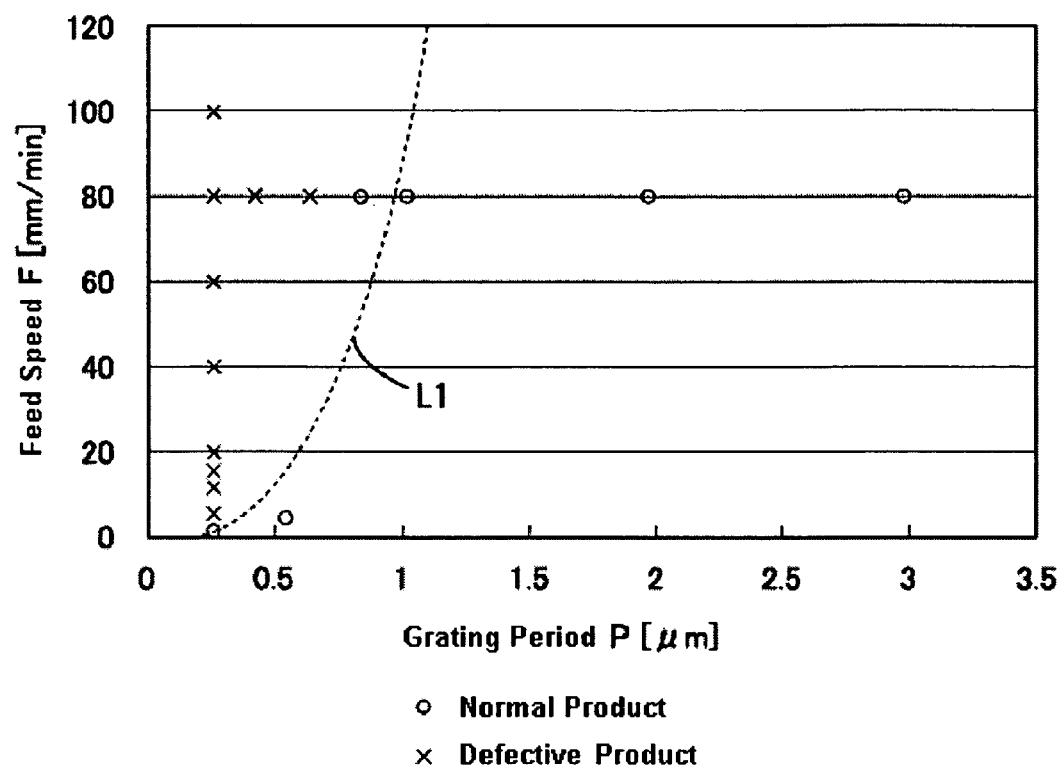

[Fig.3]
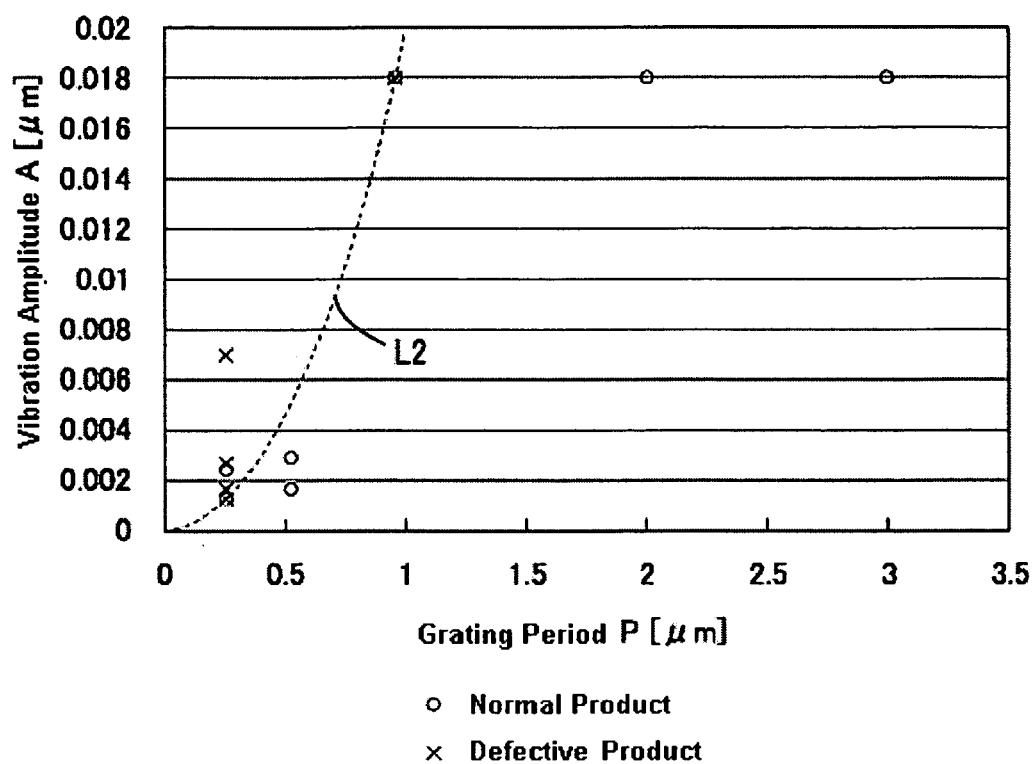

[Fig.4]
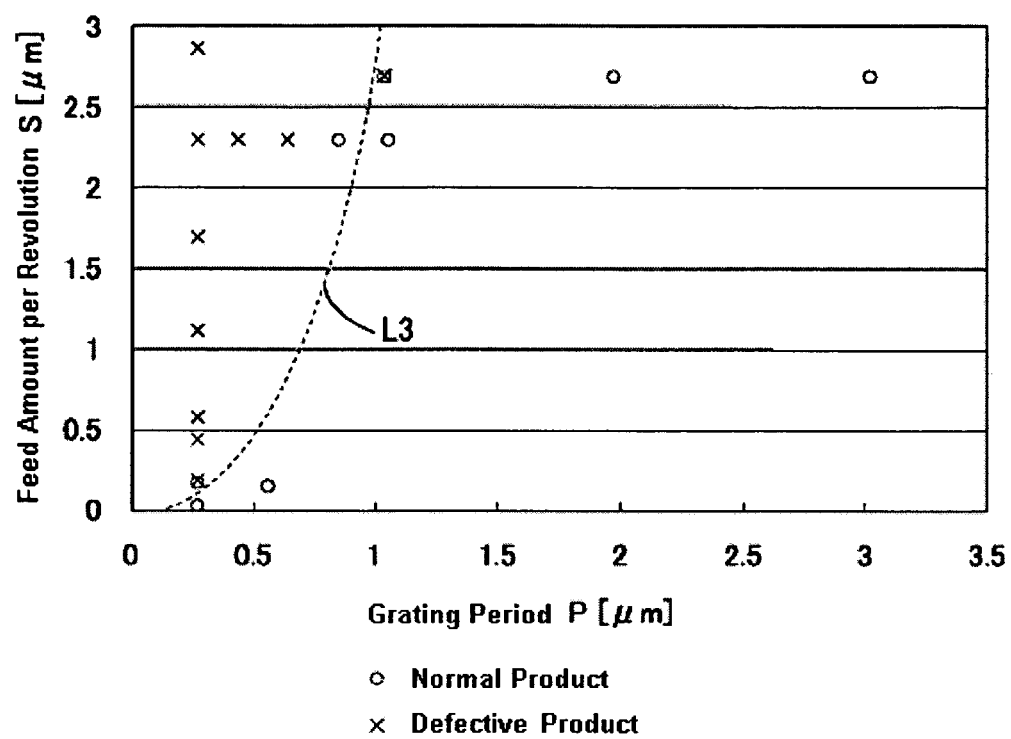

[Fig.5]
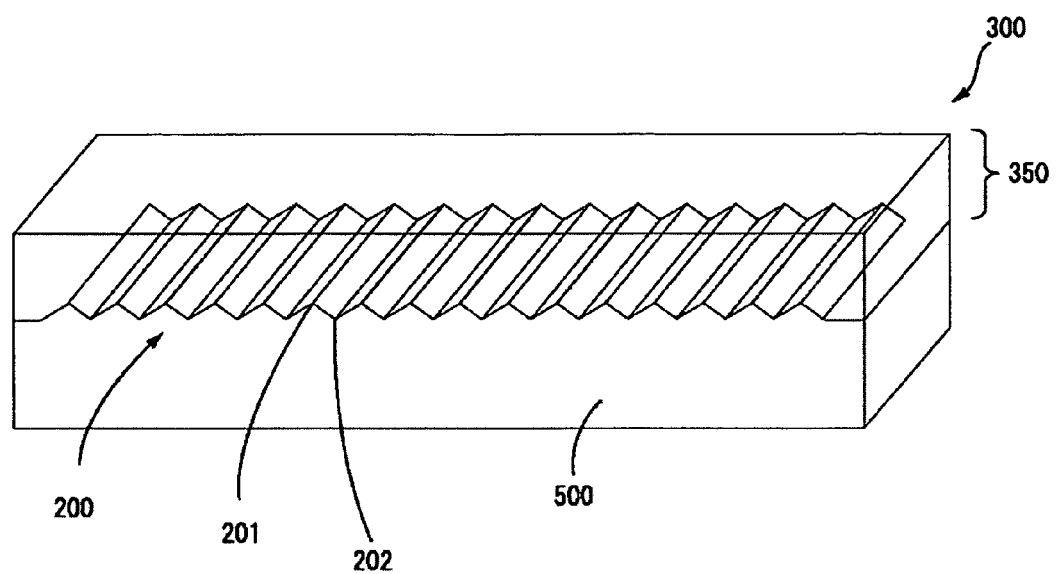

[Fig.6]
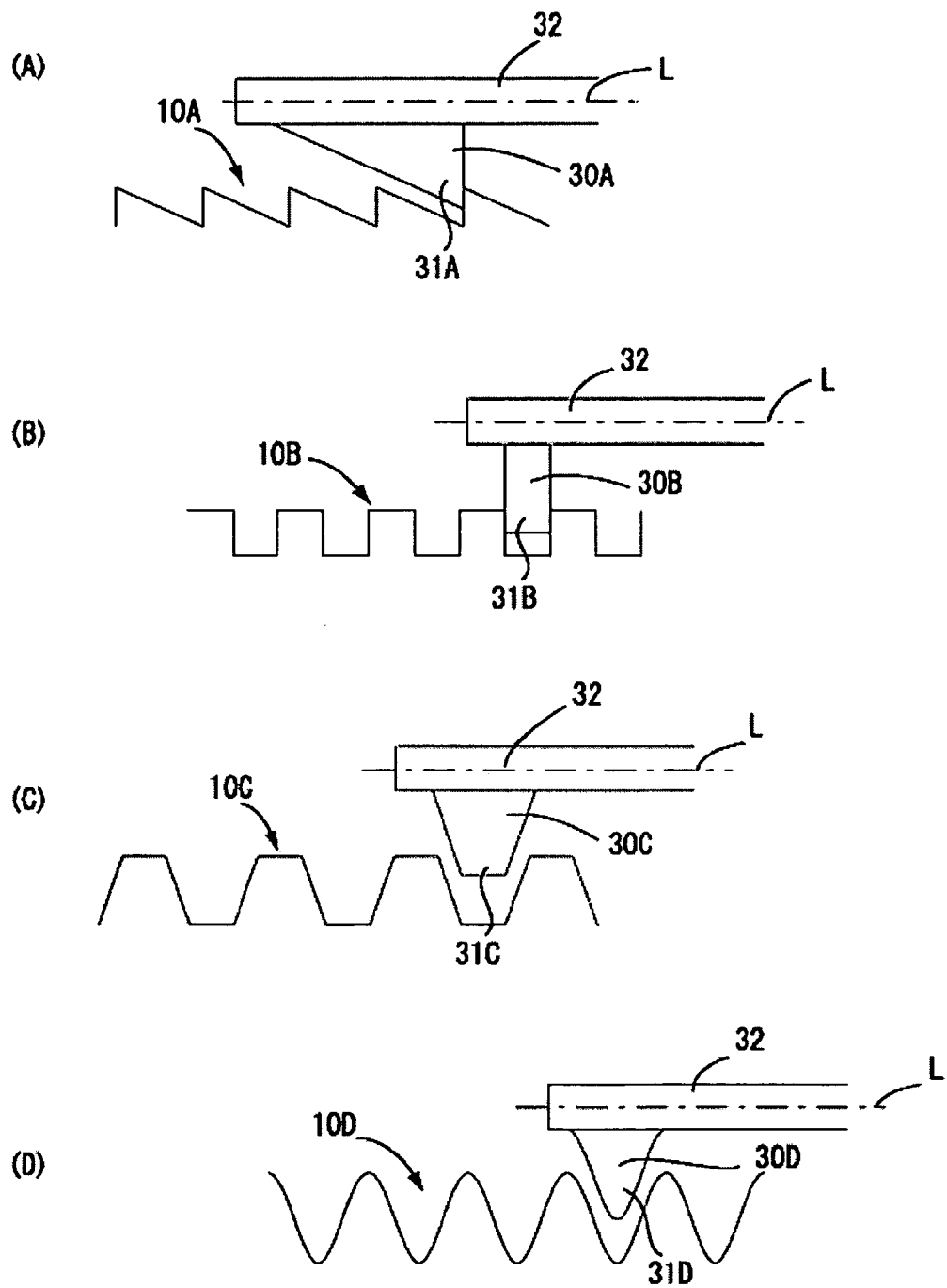

[Fig. 7]
(A)
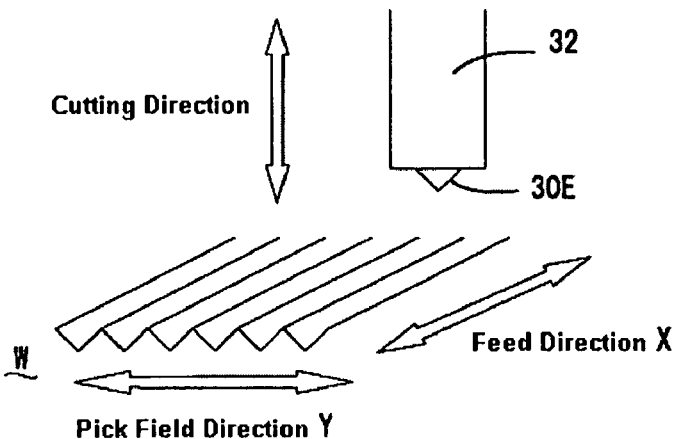
(B)
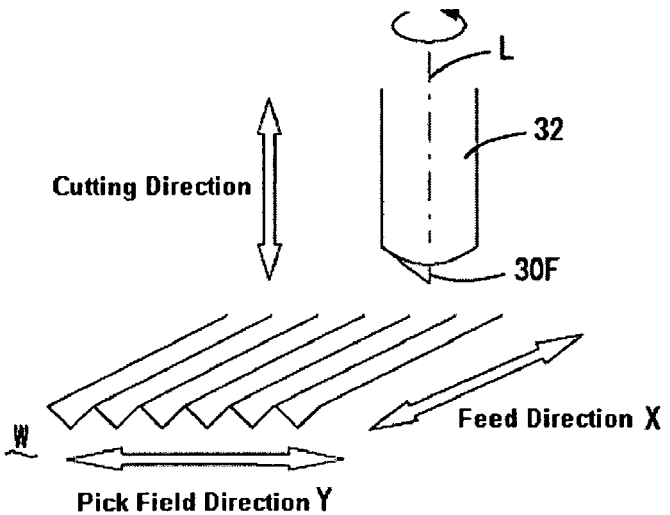
(C)
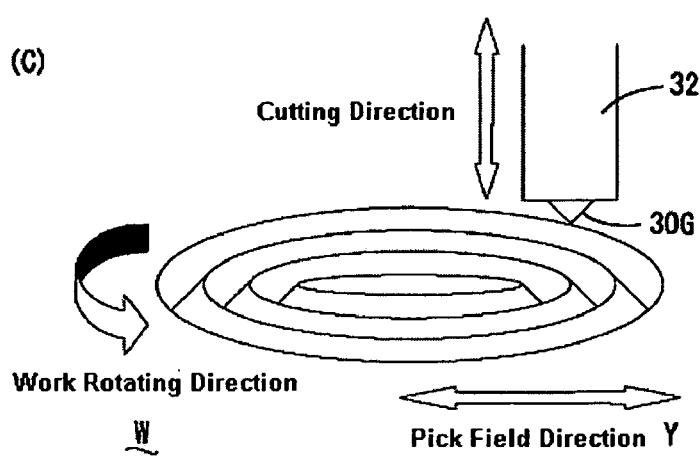

[Fig.8]
(A)
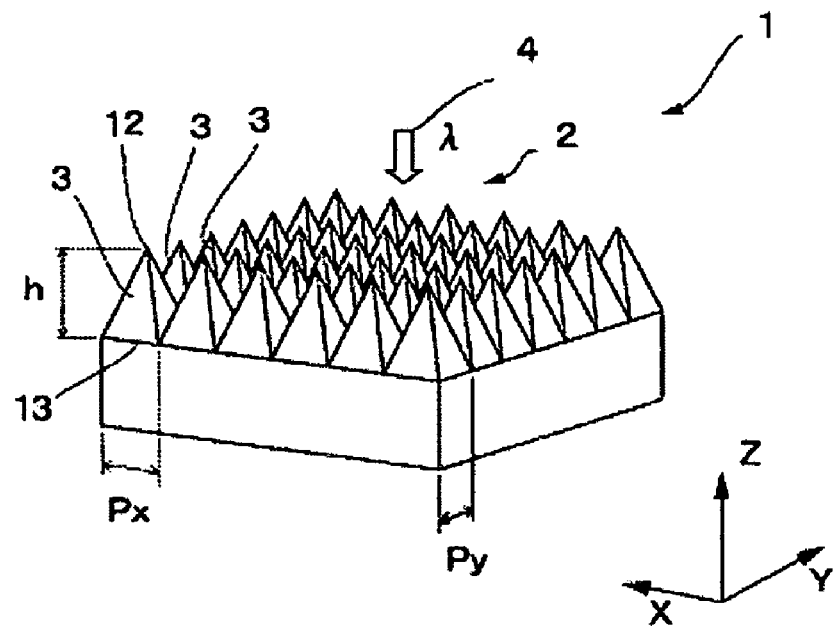
(B)
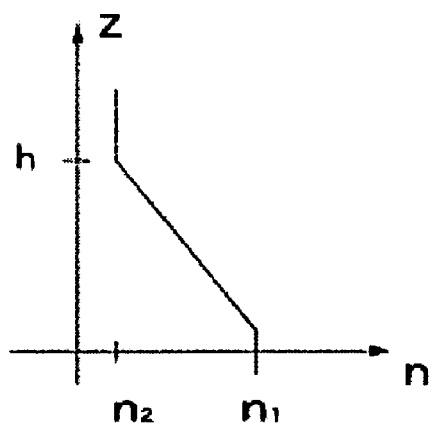

[Fig.9]
(A)
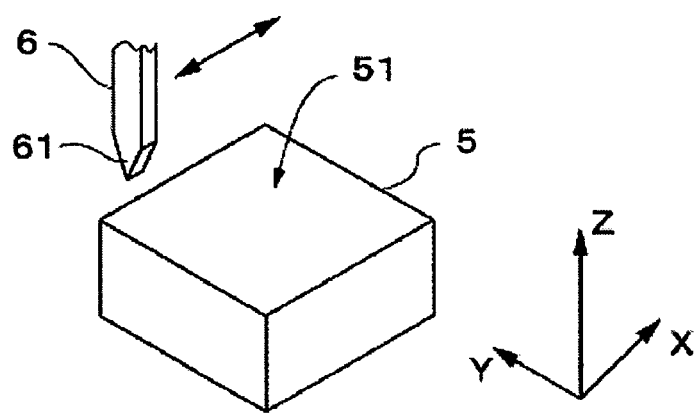
(B)
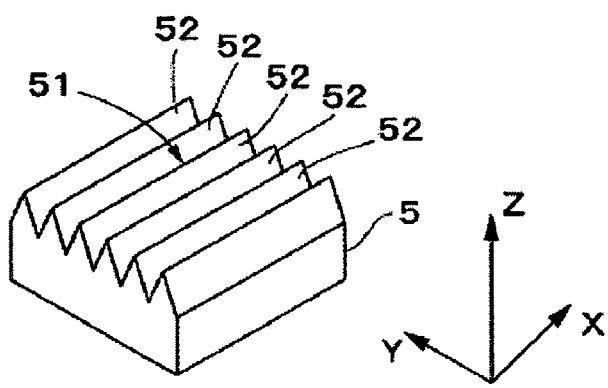
(C)
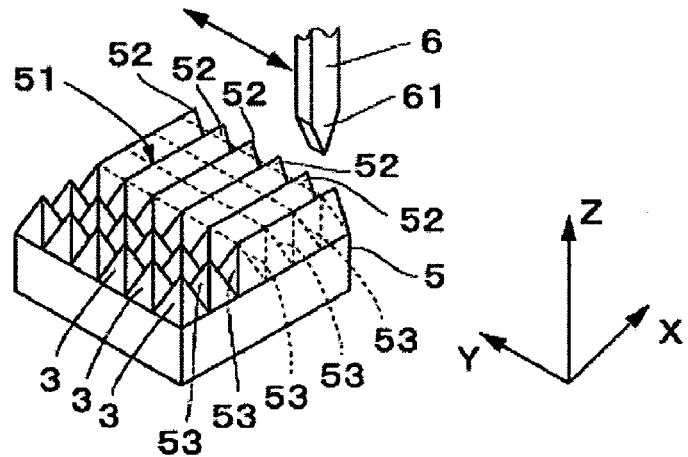

[Fig.10]
(A)
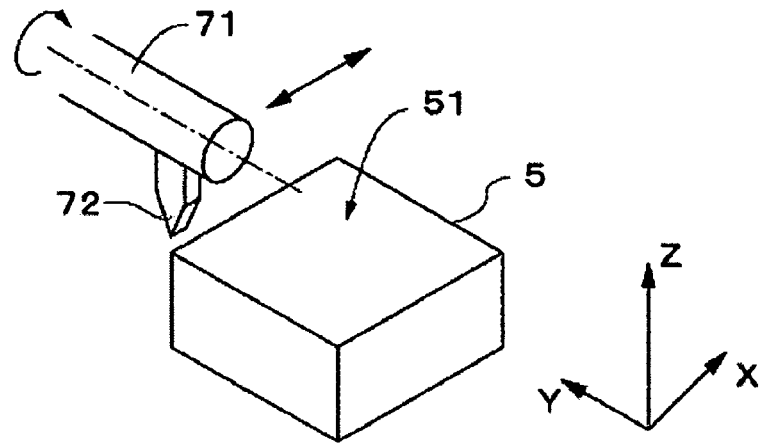
(B)
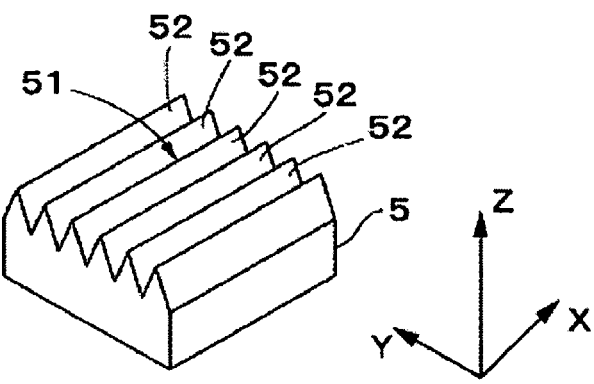
(C)
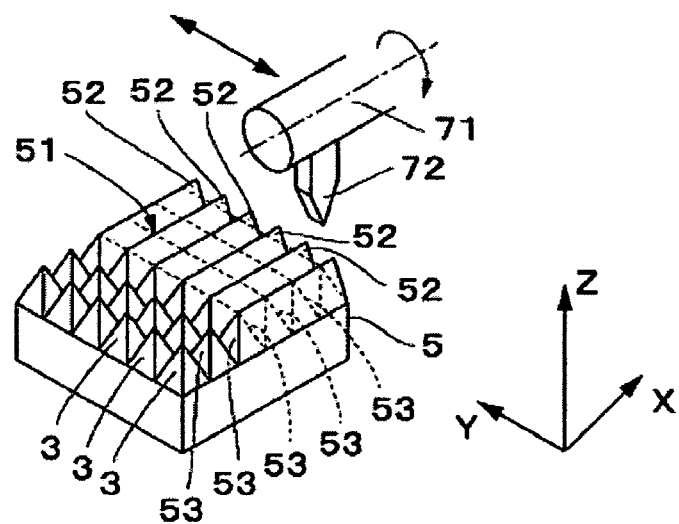

GRATING FORMING METHOD AND MANUFACTURING METHOD FOR MASTER MEMBER FOR MANUFACTURING MOLDING DIE

CROSS-REFERENCE TO RELATED APPLICATIONS

This application claims priority to Japanese Application No. 2003-187886 filed Jun. 30, 2003, Japanese Application No. 2003-332384 filed Sep. 24, 2003, and Japanese Application No. 2003-374051 filed Nov. 4, 2003, which are incorporated herein by reference.

FIELD OF THE INVENTION

The present invention relates to a grating forming method for forming a fine grating with the grating period of 1 μm or less on the surface of a blank material, a molding die where the fine grating is formed on its molding surface by the grating forming method, a molded product where the shape of the fine grating of the molding die is transferred on the surface thereof, and a manufacturing method for a master member for manufacturing a molding die.

BACKGROUND OF THE INVENTION

A photonic crystal which is an optical material having a refractive index distribution in almost the same period as the wavelength of light beam has gotten a lot of attention as a new optical material that can freely control the propagation and the generation of light beams. In the photonic crystal, a fine grating is formed on the surface of the material with the grating period in a nanometer-order. The fine grating is conventionally formed by using thin film techniques (semi-conductor process) such as an X-ray lithography or an electron beam lithography.

However, in order to perform the thin film technique, expensive facilities such as a film forming equipment, an exposure equipment, a lithography equipment, and an etching equipment are required. In addition, since a long time is required for processing, mass production can not be performed.

On the other hand, in recent years, an inexpensive processing with a high degree of efficiency has become possible by the appearance of an ultra-precision working machine. There are various types of working methods used in the ultra precision working machine such as fly cutting, planer, end mill, and lathe working methods.

The ultra-precision working machine can form gratings with the grating period of 1 μm and more with a sufficient degree of accuracy. However, in the field of nano-technologies such as a photonic crystal, it is naturally demanded that the grating period should be 1 μm or less. When the ultra-precision working machine performs in such a nanometer-order, a burr is formed and the roughness and the swelling of a worked surface are increased. On the contrary, a long working time is required when a deburring is performed after cutting work.

In an optical element used in various types of optical devices, a multi-layer film for anti-reflection is often formed on the surface of the optical element to decrease the energy loss and the stray light due to the reflection of a light beam. In such a multi-layer film, the reflection is prevented in such a manner that the respective reflected lights between the respective layers cancel each other through the interference.

However, when the multi-layer film is used for anti-reflection, the material having an optimal refractive index as the multi-layer film is limited. Thus a combination of optimal materials may not exist depending on a blank material and the wavelength of the incident light. Furthermore, the heat resisting properties and the durability may be reduced due to the physical, chemical and thermal inconsistency based on the differences of the materials of the respective layers. In addition, since the multi-layer film is formed by means of the vapor deposition, the cost of material increases.

Instead of the multi-layer film, another anti-reflection method has been known in which a grating comprising of minute projections with a shorter period than the wavelength of light is constructed on the surface of an optical element. The grating comprising minute projections with the period shorter than the wavelength of light is equivalent to a medium having a certain refractive index and gives the same anti-reflection effect as the multi-layer film. In addition, when the minute projection is formed in a conical shape or pyramid shape, its volume occupancy rate gradually changes from the base portion of the minute projection to the front end side thereof. Therefore, since the effective refractive index on the surface gradually varies, the anti-reflection characteristics are improved. Alternatively, the construction in which projections and recesses are formed on the surface at random has been proposed to realize similar anti-reflection characteristics (for example, Japanese Patent Laid-Open No. 2002-286906). However, when the grating comprising many minute projections as described above is formed by mechanical processing, it is very difficult to easily manufacture a grating such that a burr is not formed.

SUMMARY OF THE INVENTION

In view of the problems described above, it is an object and advantage of the present invention to provide a grating forming method by which the forming of a burr is restricted when a fine grating with a grating period of 1 μm or less is formed by a mechanical process and capable of reducing the roughness and the swelling of the surface of the fine grating. Further, it is another object and advantage of the present invention to provide a molding die on which a fine grating is formed on its forming surface by the grating forming method, a molded product where the shape of the fine grating formed on the molding die is transferred on its surface, and a manufacturing method for a master member for manufacturing a molding die on which a fine grating is formed on its forming surface.

Further, it is another object and advantage of the present invention to provide an anti-reflection member capable of reducing the manufacturing cost by applying the above-mentioned grating forming method to the forming of minute projections constructing a grating. Further, it is another object and advantage of the present invention to provide a molding die for an anti-reflection member and a manufacturing method for a master member for manufacturing a molding die for an anti-reflection member.

In order to achieve the above object and advantage, according to an embodiment of the present invention, there is provided a grating forming method for forming a fine grating with a grating period of 1 μm or less on a surface of a blank material including cutting the surface of the blank material with a blade tip part of a diamond cutting tool. In the embodiment of the present invention, in the case that the fine grating with the grating period of "P" μm is formed and the feed speed of the diamond cutting tool is set to be "F"

mm/min, the feed speed "F" is set so as to satisfy the following conditional expression (1):

$$F<100P^3$$

Also, in order to achieve the above object and advantage, according to another embodiment of the present invention, there is provided a grating forming method for forming a fine grating with a grating period of 1 µm or less on a surface of a blank material including cutting the surface of the blank material with a blade tip part of a diamond cutting tool. In the embodiment of the present invention, in the case that the fine grating with the grating period of "P" µm is formed and the vibration amplitude of the diamond cutting tool (in a perpendicular direction with respect to the surface of the blank material) is set to be "A" µm, the vibration amplitude "A" is set so as to satisfy the following conditional expression (2):

$$A<0.018P^2$$

Also, in order to achieve the above object and advantage, according to a further embodiment of the present invention, there is provided a grating forming method for forming a fine grating with a grating period of 1 µm or less on a surface of a blank material including cutting the surface of the blank material with a blade tip part of a diamond cutting tool. In the embodiment of the present invention, in the case that the fine grating with the grating period of "P" µm is formed and the feed amount per revolution of the diamond cutting tool is set to be "S" µm, the feed amount per revolution "S" is set so as to satisfy the following conditional expression (3):

$$S<2.9P^3$$

In accordance with an embodiment of the present invention, the cutting with the diamond cutting tool may be performed by a fly cutting working method.

In accordance with an embodiment of the present invention, the cutting with the diamond cutting tool may be performed by a fly cutting working, a planer working, an end mill working or a lathe working method. In these working methods, the feed speed of the diamond cutting tool is set to satisfy the above-mentioned conditional expression (1).

In accordance with an embodiment of the present invention, it is preferable to use a single crystal diamond cutting tool as the diamond cutting tool.

In accordance with an embodiment of the present invention, in the case that the grating is directly formed on an optical element, the blank material is a resin material for producing the optical element. Materials for a lens and an optical element have good cutting properties such as acrylic resin, norbornene resin and polyolefin resin may be used as the resin material.

Further, when the blank material on which the fine grating is formed is a metal for manufacturing a molding die, it is preferable to use an amorphous metal material as the blank material. Since the metal of the amorphous metal material is not crystalline, the burr can be prevented from being formed at the time of cutting. Further, the amorphous metal material is preferably an amorphous nickel-phosphorus plated layer.

In accordance with an embodiment of the present invention, it is preferable to use a cutting oil consisting mainly of a vegetable oil when the diamond cutting tool is used.

The grating forming method in accordance with the present invention is applied, for example, to form the fine grating on a forming surface of a molding die. Therefore, injection molding and embossing molding are performed by using the molding die to produce a molded product where the shape of the fine grating is transferred on the surface thereof.

Preferably, the grating forming method in accordance with the present invention is applied to form an anti-reflection surface by forming a large number of V-shaped grooves in an X-axis and a Y-axis directions by the cutting work on a surface of a blank material to form the anti-reflection surface made of square pyramid-shaped minute projections.

When the grating forming method in accordance with the present invention is applied to the formation of anti-reflection surface as discussed above, semiconductor processes such as the deposition of fine particles or etching are not required to form the pyramid-shaped minute projections to construct the grating. According to the present invention, cutting work is utilized and thus a high degree of productivity can be obtained and the cost of material is reduced. Further, it is easy to change the pitch and height of the minute projections constructing the grating by using the cutting work. Consequently, the manufacturing cost can be reduced.

In all of the cases in which the grating forming method in accordance with the present invention is applied, the formation of the anti-reflection surface including the following cases: the grating is directly formed on an optical element to be provided with an anti-reflection surface, the grating for forming the grating on an optical element is formed on a molding die to produce the optical element, and the grating for forming the grating on a molding die for an optical element is formed on a master member for manufacturing the molding die.

A large number of V-shaped grooves are formed in an X-axis and a Y-axis directions by cutting work on a surface of a blank material to form the anti-reflection surface comprising square pyramid-shaped minute projections.

In order to manufacture a molding die for forming an anti-reflection member, the following two methods can be adopted.

The first method is that a large number of V-shaped grooves are formed in an X-axis and a Y-axis directions by cutting work on the surface of a blank material for a molding die for forming an anti-reflection member to form square pyramid-shaped minute projections which are respectively surrounded with the V-shaped grooves.

The second method is that, as similar to the first method, a large number of V-shaped grooves are formed in an X-axis and a Y-axis directions by cutting work on the surface of a blank material for a master member for a molding die for forming an anti-reflection member to form square pyramid-shaped minute projections which are respectively surrounded with the V-shaped grooves. Then, the shape of the minute projections formed on the master member is transferred to a blank material for a molding die to form the forming face for an anti-reflection surface of the molding die. By means of a molding die manufactured by the second method for forming an anti-reflection member, pyramid-shaped minute projections constructing the grating for anti-reflection are formed on the anti-reflection surface of the anti-reflection member which is molded by injection molding or press molding.

Alternatively, by means of the molding die manufactured by the first method for forming an anti-reflection member, pyramid-shaped minute holes are formed on the anti-reflection surface of the anti-reflection member which is molded by injection molding or press molding. The minute holes described above provide an anti-reflection effect similar to the minute projections. The shape of the minute holes may be preferably formed in a pyramid shape similar to the minute projections. Also in this case, the volume occupancy rate of the minute hole gradually changes from the base portion of the minute hole to its front end side and thus the effective refractive index on the surface gradually varies and the anti-reflection characteristics are improved.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1(A) is a perspective view showing a grating forming method in accordance with an embodiment of the present invention and FIG. 1(B) is its sectional view.

FIG. 2 is a graph showing the occurrence of burr when the period of grating formed on the surface of a blank material and the feed speed of a diamond cutting tool are varied at the time of working shown in FIG. 1.

FIG. 3 is a graph showing the occurrence of burr when the period of grating formed on the surface of the blank material and the vibration amplitude in the cutting direction (perpendicular direction with respect to the surface of the blank material) of the diamond cutting tool are varied at the time of working shown in FIG. 1.

FIG. 4 is a graph showing the occurrence of burr when the period of grating formed on the surface of the blank material and the feed amount of the diamond cutting tool during its rotating period of the cutting tool are varied at the time of working shown in FIG. 1.

FIG. 5 is an explanatory view of a diffraction grating in a distributed feedback resonator as an example of a molded product molded by means of a molding die, on which a fine grating is formed by the method in accordance with an embodiment of the present invention.

FIGS. 6(A), 6(B), 6(C) and 6(D) are modified examples of the grating forming method in accordance with an embodiment of the present invention. FIG. 6(A) is an explanatory view showing a method to form a saw blade-shaped grating, FIG. 6(B) is an explanatory view showing a method to form a rectangular grating, FIG. 6(C) is an explanatory view showing a method to form a trapezoid shaped grating and FIG. 6(D) is an explanatory view showing a method to form a sinusoidal grating.

FIGS. 7(A), 7(B) and 7(C) are another modified examples of the grating forming method in accordance with an embodiment of the present invention. FIG. 7(A) is an explanatory view showing a planer working method, FIG. 7(B) is an explanatory view showing an end mill working method and FIG. 7(C) is an explanatory view showing a lathe working method.

FIG. 8(A) is a perspective view showing an optical element on which the grating forming method in accordance with the embodiment of the present invention is applied and FIG. 8(B) is an explanatory view showing a refractive index distribution on the surface of the optical element.

FIGS. 9(A), 9(B) and 9(C) are explanatory views showing a method for forming square pyramid-shaped minute projections constructing a grating on the optical element shown in FIG. 8(A).

FIGS. 10(A), 10(B) and 10(C) are explanatory views showing another method for forming square pyramid-shaped minute projections constructing a grating on the optical element shown in FIG. 8(A).

DETAILED DESCRIPTION OF THE PREFERRED EMBODIMENTS

Embodiments of the present invention will be described below with reference to the accompanying drawings.

Method for Forming a Fine Grating

FIG. 1(A) is a perspective view showing a grating forming method in accordance with an embodiment of the present invention and FIG. 1(B) is its sectional view.

As shown in FIGS. 1(A) and 1(B), in the embodiment of the present invention, the surface of a blank material "W" is cut with the blade tip part 31 of a diamond cutting tool 30 in order to form a fine grating 10 with a grating period of 1 μm or less on the surface of the blank material "W". The working method shown here is a fly cutting method in which a diamond cutting tool 30 protruding in a perpendicular direction with respect to the axial line L of a shank 32 is used. The diamond cutting tool 30 is formed of a single crystal diamond and provided with a blade tip part 31 formed in a "V"-shape with the angle of 90°.

The blank material "W" is a metal member for manufacturing a molding die. An amorphous nickel-phosphorus plated layer is formed on the surface of the metal member more than the thickness which is necessary for cutting work. Since the plated layer is formed of the amorphous layer, the cutting properties are superior. Accordingly, a high cutting speed can be set and thus the working efficiency is improved. In addition, when the blank material "W" is cut by the diamond cutting tool 30, cutting oil containing vegetable oil as the main component is preferably used. When the cutting oil described above is used, the occurrence of oil stain is restrained and thus the washing of the machined surface after cutting becomes easy.

The fine grating 1 0 with a grating period of at most 1 μm is formed on the surface of the blank material "W" by using the diamond cutting tool 30 by a fly cutting method. In other words, the diamond cutting tool 30 and the blank material "W" are relatively moved in the feed direction "X" while the shank 32 is rotated about the axial line L and the surface of the blank material "W" is cut with the blade tip part 31 of the diamond cutting tool 30. As a result, a V-shaped groove whose cross-section is in a triangular shape is formed in the feed direction "X". According to the fly cutting method, the discharge of chips is smoothly performed and thus a high degree of working accuracy is attained.

Next, the diamond cutting tool 30 and the blank material "W" are relatively moved in the pick field direction "Y" by a prescribed pitch and then a V-shaped groove with a triangular cross-section is formed in the feed direction "X" again.

The fine grating 10 with the grating pitch (period) of at most 1 μm, i.e., in the nanometer-order, for example, the fine grating 10 with the grating pitch (period) of several hundred nanometers is formed by repeating the above-mentioned cutting operation.

When the extremely minute fine grating 10 as described above is formed, in the embodiment of the present invention, the working condition is set as follows based on the new findings obtained from the detail investigation.

Feed Speed

FIG. 2 is a graph showing the occurrence of burr when the period of grating formed on the surface of a blank material and the feed speed of a diamond cutting tool are varied at the time of working shown in FIG. 1.

In FIG. 2, when the fly cutting work shown in FIG. 1 is performed, the period of the minute grating 10 formed on the surface of the blank material "W" and the feed speed of the diamond cutting tool 30 are varied. The result that the burr is not formed is marked "○" which means a normal product and the result that the burr is formed is marked "x" which means a defective product. In addition, the border line between the normal product and the defective product is obtained based on the results shown in FIG. 2 and other experimental results, which is shown by the solid line L1.

As a result, in the case that the minute grating 10 with the grating period of "P" μm is formed by cutting the surface of the blank material "W" with the blade tip part 31 of the diamond cutting tool 30, when the feed speed of the diamond cutting tool 30 is set to be "F" mm/min, the border line (dotted line L1) shown in FIG. 2 is shown by the following expression:

$$F=100P^3$$

Accordingly, The feed speed "F" is set to satisfy the following conditional expression (1):

$$F<100P^3$$

Then the occurrence of the burr can be prevented.

Vibration Amplitude

FIG. 3 is a graph showing the occurrence of burr when the period of grating formed on the surface of the blank material and the vibration amplitude in the cutting direction (perpendicular direction with respect to the surface of the blank material) of the diamond cutting tool are varied at the time of working shown in FIG. 1. The vibration amplitude may include the amplitude of vibration due to the eccentricity of the shank 32 and the amplitude of vibration due to the diamond cutting tool 30 provided on the tip end of the shank 32.

In FIG. 3, when the fly cutting work shown in FIG. 1 is performed, the period of the minute grating 10 formed on the surface of the blank material "W" and the vibration amplitude in the cutting direction (perpendicular direction with respect to the surface of the blank material) of the diamond cutting tool 30 are varied. The result that the burr is not formed is marked "○" which means a normal product and the result that the burr is formed is marked "x" which means a defective product. In addition, the border line between the normal product and the defective product is obtained based on the results shown in FIG. 3 and other experimental results and is shown by the dotted line L2.

As a result, in the case that the minute grating 10 with the grating period of "P" μm is formed by cutting the surface of the blank material "W" with the blade tip part 31 of the diamond cutting tool 30, when the vibration amplitude of the diamond cutting tool 30 is set to be "A" μm, the border line (dotted line L2) shown in FIG. 3 is shown by the following expression:

$$A=0.018P^2$$

Accordingly, the vibration amplitude "A" is set to satisfy the following conditional expression (2):

$$A<0.018P^2$$

Then the occurrence of the burr can be prevented.

Feed Amount Per Revolution

FIG. 4 is a graph showing the occurrence of burr when the period of grating formed on the surface of the blank material and the feed amount of the diamond cutting tool during its rotating period of the cutting tool are varied at the time of working shown in FIG. 1.

In FIG. 4, when the fly cutting work shown in FIG. 1 is performed, the period of the minute grating 10 formed on the surface of the blank material "W" and the feed amount per revolution of the diamond cutting tool 30 are varied. The result that the burr is not formed is marked "○" which means a normal product and the result that the burr is formed is marked "x" which means a defective product. In addition, the border line between the normal product and the defective product is obtained based on the results shown in FIG. 4 and other experimental results, which is shown by the dotted line L3.

As a result, in the case that the minute grating 10 with the grating period of "P" μm is formed by cutting the surface of the blank material "W" with the blade tip part 31 of the diamond cutting tool 30, when the feed amount per revolution of the diamond cutting tool 30 is set to be "S" μm, the border line (dotted line L3) shown in FIG. 4 is shown by the following expression:

$$S=2.9P^3$$

Accordingly, the feed amount per revolution "S" is set to satisfy the following conditional expression (3):

$$S<2.9P^3$$

Then the occurrence of the burr can be prevented.

Effects of this Embodiment

In the case that the surface of the blank material "W" is cut with the blade tip part 31 of the diamond cutting tool 30 under the condition which satisfies the above-mentioned conditional expression (1), (2) or (3), the burr is not formed at the time of cutting even when the minute grating 10 with the grating period of 1 μm or less is formed. Accordingly, deburring is not required after cutting work and thus the man-hours and working hours can be reduced. Further, the surface roughness and the occurrence of waviness of the grating can be prevented and thus the variation of the grating period can be reduced and the configuration accuracy of the minute grating 10 is improved. In addition, within the condition which is set according to the grating period, the burr is not formed and thus the feed speed can be increased within the range where the burr is not formed. Accordingly, the working hours can be reduced.

Forming by Molding Die

FIG. 5 is an explanatory view of a diffraction grating in a distributed feedback resonator as an example of a molded product molded by means of a molding die, on which a fine grating is formed by the method in accordance with an embodiment of the present invention.

The molding die manufactured by the method described above can produce a diffraction grating on which the minute grating of a molding die is transferred. Also, the molding die can produce an optical element provided with an anti-reflection surface or the like. The blank material is made of, for example, a thermoplastic resin or a thermosetting resin and molded with a molding die or transferred by a hot embossing method.

As an example of a molded product with a minute diffraction grating, FIG. 5 shows a Bragg reflection resonator 300 (distributed feedback resonator) for an organic semiconductor laser with a diffraction grating 200. In the distributed feedback resonator 300 of the laser device, a diffraction grating 200 is formed in such a manner that a V-shaped projection 201 (protruded part) of a V-shaped cross-section formed in a stripe-shape and a V-shaped groove 202 (recessed part) of a V-shaped cross-section formed in a stripe-shape are alternately arranged on the surface of a transparent substrate 500 (molded product) having a function as a clad layer. An active layer 350 containing organic coloring matter is formed on the surface where the diffraction grating 200 is formed. Therefore, when an excited light beam is incident from the side of the active layer 350, the reflection and amplification of the light beam with a specified wavelength occurs by the diffraction grating 200 and the laser beam of the specified wavelength is emitted.

Modified Embodiments

The embodiment described above is the example in which a triangular grating of a V-shaped cross-section is formed by using the diamond cutting tool 30 with the blade tip part 31 formed in a "V" shape in a fly cutting work. Alternatively, as shown in FIG. 6(A), when a cutting tool is used on which a diamond cutting tool 30A having a saw tooth edge-shaped blade tip part 31A is perpendicularly protruded with respect to the axial line "L" of the shank 32, a saw tooth edge-shaped grating 10A may be formed. Also, as shown in FIG. 6(B), when a cutting tool is used on which a diamond cutting tool 30B having a rectangular blade tip part 31B is perpendicularly protruded with respect to the axial line "L" of the shank 32, a rectangular grating 10B may be formed. Further, as shown in FIG. 6(C), when a cutting tool is used on which a diamond cutting tool 30C having a trapezoid blade tip part 31C is perpendicularly protruded with respect to the axial line "L" of the shank 32, a trapezoid grating 10C may be formed. Further, as shown in FIG. 6(D), when a cutting tool is used on which a diamond cutting tool 30D having a wave-formed blade tip part 31D is perpendicularly protruded with respect to the axial line "L" of the shank 32, a sinusoidal grating 10D may be formed.

Other Working Methods

In the above-mentioned embodiment, the fly cutting working method is described as the example. Alternatively, as shown in FIG. 7(A), the present invention may be applied to a planer working method by which a diamond cutting tool 30E is moved in the feed direction "X" without being rotated and is drawn for cutting the surface of the blank material by the blade tip part of the diamond cutting tool 30E to form the fine grating. In this case, the working condition is set to satisfy the above-mentioned conditional expression (1).

Further, as shown in FIG. 7(B), the present invention may be applied to an end milling working method by which a diamond cutting tool 30F protruding in the axial direction with respect to the shank 32 is moved in the feed direction "X" while being rotated about the axial line "L" of the shank 32 and cut the surface of the blank material by the blade tip part of the diamond cutting tool 30F to form the fine grating. In this case, the working condition is set to satisfy either or all of the conditional expressions (1), (2) and (3).

Furthermore, as shown in FIG. 7(C), the present invention may be applied to a lathe working method by which a diamond cutting tool 30G protruding in the axial direction with respect to the shank 32 is fixed and the blank material is rotated to form a concentric circular grating for forming the fine grating. In this case, the working condition is set to satisfy the conditional expression (1).

APPLICATION EXAMPLES

Next, an optical element (anti-reflection member) on which a grating for anti-reflection is formed will be described below, to which the present invention is applied, and a minute projection forming method for forming a pyramid-shaped minute projections for constructing the grating will be described below, to which the present invention is applied.

Construction of Optical Element

FIG. 8(A) is a perspective view showing an optical element on which a grating forming method in accordance with the embodiment of the present invention is applied and FIG. 8(B) is an explanatory view showing a refractive index distribution on the surface of the optical element shown in FIG. 8(A).

An optical element 1 shown in FIG. 8(A) is, for example, a diffraction grating or an objective lens included in a common optical system, which is used in an optical apparatus such as an optical pickup device for performing reproduction or the like from different types of optical record disks such as a CD or a DVD by using a laser beam. The surface of the optical element 1 is provided with a grating 2 for anti-reflection.

The grating 2 is constructed such that a large number of square pyramid-shaped minute projections 3 are periodically and two dimensionally arranged. The square pyramid-shaped minute projections 3 are, as shown in FIGS. 8(A) and 9(C), formed in a matrix shape by V-shaped grooves 52 which are parallel in the X-axis and V-shaped grooves 53 which are parallel in the Y-axis when the coordinate axes orthogonal to one another are respectively set to be the X-axis, Y-axis, and Z-axis. Each of the minute projections 3 is extended so as to have the height "h" in the Z-axis direction from the rectangular bottom part 13 (base portion) toward the tip end part 12. Therefore, the volume occupancy rate between the surrounding medium and the square pyramid-shaped minute projection 3 gradually varies from the bottom part 13 toward the tip end part 12 of the minute projection 3. Therefore, as shown in FIG. 8(B), the refractive index "n" gradually varies from the refractive index "n2" of the surrounding medium (air) to the refractive index "n1" of the square pyramid-shaped minute projection 3 within the range of the height "h" from the bottom part 13 to the tip end part 12 of the grating 2. Further, the periods "Px" and "Py" of the bottom part 13 in the X-axis direction and the Y-axis direction are respectively set to be shorter than the wavelength $\lambda$ of the incident light beam 4 that is incident on the optical element 1. Accordingly, since the variation of the refractive index with respect to the incident light 4 becomes gradual by the grating 2 of the optical element 1, the anti-reflection of the incident light 4 can be performed.

First Manufacturing Method for Optical Element 1

FIGS. 9(A), 9(B) and 9(C) are explanatory views showing a method for forming square pyramid-shaped minute projections constructing the grating on the optical element shown in FIG. 8(A).

In the embodiment of the present invention, as shown in FIGS. 9(A) and 9(B), the surface 51 of a blank material 5 for an optical element is cut with a cutting tool 6. The cutting tool 6 is a diamond cutting tool made of a single crystal with a V-shaped blade tip part 61. A V-shaped groove 52 extending in the X-axis direction is formed on the surface 51 by cutting the surface 51 of the blank material 5 with the cutting tool 6 and, whenever one V-shaped groove 52 has been cut, the cutting tool 6 is moved in the Y-axis direction and then the next V-shaped groove 52 is formed on the surface 51 by the cutting work. By repeating the above-mentioned cutting work, the first V-shaped grooves 52 are formed on the surface of the blank material 5 for the optical element that are arranged in the Y-axis direction. The working pitch (period) of the first V-shaped grooves 52 is set to be equal to or less than the wavelength λ of the incident light 4.

Next, as shown in FIG. 9(C), the direction of the cutting tool 6 is changed by 90°(90 degrees) and a second V-shaped groove 53 vertical to the first V-shaped groove 52 is formed on the surface 51 in the Y-axis direction by the cutting work. Whenever the second V-shaped groove 53 has cut, the cutting tool 6 is moved in the X-axis direction and then the next V-shaped groove 53 is formed by the cutting work. The working pitch (period) of the second V-shaped grooves 53 is also set to be equal to or less than the wavelength λ of the incident light 4.

According to the cutting work described above, the first V-shaped grooves 52 and the second V-shaped grooves 53 are formed on the surface 51 of the blank material 5 to form square pyramid-shaped minute projections 3 surrounded by the first V-shaped grooves 52 and the second V-shaped grooves 53. In the embodiment described above, the cutting of the second V-shaped groove 53 is performed by changing the direction of the cutting tool 6 by 90°(90 degrees) with respect to the blank material 5 for the optical element. Alternatively, the cutting of the second V-shaped groove 53 may be performed by turning the blank material 5 for the optical element by 90°(90 degrees) with respect to the cutting tool 6.

When the square pyramid-shaped minute projections 3 are formed on the surface 51 of the blank material 5 so as to be sectioned by the first V-shaped grooves 52 and the second V-shaped grooves 53 as described above, the working conditions described above are applied.

The embodiment shown in FIG. 9 is the case of a planer working method where the diamond cutting tool 6 is moved in the feed direction without being rotated to cut the surface of the blank material with the blade tip part of the diamond cutting tool 6. Therefore, in the case that the first V-shaped grooves 52 and the second V-shaped grooves 53 with the grating period of "P" μm are formed by cutting the surface 51 of the blank material 5 of the optical element with the blade tip part 61 of the diamond cutting tool 6, when the feed speed of the diamond cutting tool 6 is set to be "F" mm/min, the feed speed "F" is set to satisfy the following conditional expression (1):

$$F<100P^3$$

As described above, in the embodiment of the present invention, the square pyramid-shaped minute projections 3 are formed by a mechanical processing with the use of the cutting tool 6. Accordingly, the cost of material can be reduced and a high productivity is obtained in comparison with the methods of utilizing the etching, photo lithography, electron beam lithography or the like. Further, mechanical processing is used and thus a high degree of freedom of the working shape is obtained and it is easy to change the pitch and the height of the minute projections 3. Consequently, the manufacturing cost of the optical element 1 provided with the anti-reflection surface can be reduced. Further, the forming of the burr can be restricted by cutting work so as to satisfy the respective conditional expressions.

Second Manufacturing Method for Optical Element 1

FIGS. 10(A), 10(B) and 10(C) are explanatory views showing another method for forming square pyramid-shaped minute projections constructing the grating 2 on the optical element shown in FIG. 8(A).

In the first manufacturing method described above, the diamond cutting tool with the "V"-shaped blade tip part is moved straight to form the "V"-shaped grooves. However, as shown in FIGS. 10(A), 10(B) and 10(C), a "V"-shaped diamond cutting part 72 is provided on the tip end portion of a shank 71 and "V"-shaped grooves 52 and 53 are formed on the surface 51 of the blank material 5 for an optical element by the fly cutting method where the shank 71 is rotated at a high speed around the axis thereof. According to the construction described above, the square pyramid-shaped minute projections 3 constructing the grating 2 for anti-reflection can be also formed.

When the square pyramid-shaped minute projections 3 are formed on the surface 51 of the blank material 5 so as to be sectioned by the first V-shaped grooves 52 and the second V-shaped grooves 53 by means of the fly cutting method as described above, the working conditions described above are applied. In other words, in the case that the first V-shaped grooves 52 and the second V-shaped grooves 53 with the grating period of "P" μm are formed by cutting the surface 51 of the blank material 5 of the optical element with the diamond cutting part 72, when the feed speed of the diamond cutting part 72 is set to be "F" mm/min, the feed speed "F" is set to satisfy the following conditional expression (1):

$$F<100P^3$$

In addition, in the case that the first V-shaped grooves 52 and the second V-shaped grooves 53 with the grating period of "P" μm are formed by cutting the surface 51 of the blank material 5 of the optical element with the diamond cutting part 72, when the vibration amplitude of the diamond cutting part 72 is set to be "A" μm, the vibration amplitude "A" is set to satisfy the following conditional expression (2):

$$A<0.018P^2$$

Furthermore, in the case that the first V-shaped grooves 52 and the second V-shaped grooves 53 with the grating period of "P" μm are formed by cutting the surface 51 of the blank material 5 of the optical element with the diamond cutting part 72, when the feed amount per revolution of the diamond cutting part 72 is set to be "S" μm, the feed amount per revolution "S" is set to satisfy the following conditional expression (3):

$$S<2.9P^3$$

The fundamental construction for the steps performed in the second manufacturing method of the embodiment described above is common to that of the first manufacturing method explained with reference to FIG. 9. The same notational symbols are its corresponding portions and thus the description is discussed above.

Third Manufacturing Method for Optical Element 1

In the first and second manufacturing methods described above, the "V"-shaped grooves 52 and 53 are directly formed on the surface 51 of the blank material 5 for an optical element to form the optical element 1 provided with the anti-reflection surface comprising the square pyramid-shaped minute projections 3. In addition, by using the same method explained with reference to FIGS. 9 and 10, a large number of V-shaped grooves are formed in the X-axis and Y-axis directions by the cutting work on the surface of a blank material for manufacturing a molding die or a master member for manufacturing a molding die for producing an anti-reflection member. In these cases, a molding die or a master member for a molding die may be manufactured on which square pyramid-shaped minute projections are formed so as to be sectioned by the "V"-shaped grooves 52 and 53 in the X-axis and Y-axis directions.

When a master member for manufacturing a molding die is manufactured in order to form an anti-reflection member, the shape of the minute projections formed on the master member is transferred to a blank material for a molding die to construct a forming face of the molding die for the anti-reflection surface comprising minute holes. Therefore, the pyramid-shaped minute projections that construct the grating for anti-reflection are formed on the anti-reflection surface of an anti-reflection member, which is molded by injection molding or press molding by means of the forming face of the anti-reflection surface of the molding die.

Alternatively, a molding die for anti-reflection member is manufactured by means of that a large number of V-shaped grooves are formed in the X-axis and Y-axis directions by the cutting work on the surface of a molding die for producing an anti-reflection member. In this case, pyramid-shaped minute holes are formed on the anti-reflection surface of an anti-reflection member, which are molded by the means of the forming face for an anti-reflection surface of the molding die by injection molding or press molding. The minute holes described above provide an anti-reflection effect similar to the minute projections. The shape of the minute holes may be preferably formed in a pyramid shape similar to the minute projections. In this case, the volume occupancy rate of the minute hole gradually changes from the base portion of the minute hole to its front end side and thus the effective refractive index on the surface gradually varies and the anti-reflection characteristics are improved.

According to the embodiments described above, square pyramid-shaped minute projections are formed by cutting work. Therefore, material costs can be reduced and working time can be also shortened in comparison to the methods that use an etching, a photo lithography, electron beam lithography or the like. Accordingly, the master member for manufacturing a molding die and the molding die for forming anti-reflection member can be manufactured at a low cost. Further, the mechanical processing is utilized and thus the degree of freedom of the working shape can be improved. In addition, it is easy to change the pitch and the height of the minute projections. Consequently, the manufacturing cost of an optical element provided with an anti-reflection surface can be reduced.

As described above, in the grating forming method in accordance with the embodiment of the present invention, when the surface of the blank material is cut with a blade tip part of a diamond cutting tool and the fine grating with the grating period of 1 μm or less is formed, the feed speed, the vibration amplitude or the feeding amount per revolution is controlled so as to correspond the grating period of the fine grating. Therefore, the burr is not formed at the time of cutting and the roughness and the swell of the fine grating are restricted. Accordingly, since the deburring work is not required after cutting work, the man-hours and working time can be reduced. Further, the burr is not formed and the roughness and swell are restricted under the conditions set for the grating period as described above. Therefore, the feed speed or the like can be increased within the range where the burr is not formed and thus the working time can be reduced.

Furthermore, cutting work is utilized to form pyramid-shaped minute projections for constructing an anti-reflection surface and thus a high degree of productivity can be attained and the material costs can be reduced. Also, the mechanical processing is utilized and thus it is easy to change the pitch and the height of the minute projections for constructing the anti-reflection surface. Consequently, the manufacturing cost of the anti-reflection member, its molding die or the like can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A grating forming method for forming a fine grating with a grating period of at most 1 μm on a surface of a blank material comprising:

feeding a diamond cutting tool relative to the blank material in a groove forming direction while rotating the diamond cutting tool about the axial line; and cutting the surface of the blank material with a blade tip part of the diamond cutting tool to form grooves in the blank material while rotating and feeding the diamond cutting tool, wherein when the fine grating with the grating period of "P" μm is formed and the feed amount per revolution of the diamond cutting tool is set to be "S" μm, the feed amount per revolution "S", with which the diamond cutting tool is fed in the groove forming direction while rotating the diamond cutting tool about its axial line, is set to satisfy the following conditional expression:

$S < 2.9 P^3$.

2. The grating forming method according to claim 1, wherein the cutting with the diamond cutting tool is performed by a fly cutting working method.

3. The grating forming method according to claim 1, wherein the diamond cutting tool is a single crystal diamond cutting tool.

4. The grating forming method according to claim 1, wherein the blank material is a resin material for producing an optical element.

5. The grating forming method according to claim 1, wherein the blank material on which the fine grating is formed is an amorphous metal material.

6. The grating forming method according to claim 5, wherein the amorphous metal material is an amorphous nickel-phosphorus plated layer.

7. The grating forming method according to claim 1, further comprising using a cutting oil mainly consisting of a vegetable oil when the cutting by the diamond cutting tool is performed.

8. The grating forming method according to claim 1, further comprising:

providing an optical element as the blank material, and forming a large number of V-shaped grooves in an X-axis direction and a Y-axis direction by the cutting work on the surface of the optical element to form the optical element provided with the anti-reflection surface made of a square pyramid-shaped minute projections.

9. A manufacturing method for a master member for manufacturing a molding die comprising:

providing a blank material for manufacturing a master member for manufacturing a molding die, and forming a fine grating on a surface of the blank material by the grating forming method according to claim 1.

10. The manufacturing method for a master member according to claim 9, further comprising forming a large number of V-shaped grooves in an X-axis direction and a Y-axis direction by the cutting work on a surface of the blank material to form the master member provided with a square pyramid-shaped minute projections.

11. A grating forming method for forming a fine grating on a surface of a blank material comprising: feeding a diamond cutting tool relative to the blank material in a groove forming direction while rotating the diamond cutting tool about its axial line; and cutting the surface of the blank material with a blade tip part of the diamond cutting tool, to form grooves in the blank material while rotating and feeding the diamond cutting tool, to form the fine grating with a grating period of at most 1 μm wherein when the fine grating with the grating period of "P" μm is formed and the feed amount per revolution of the diamond cutting tool is set to be "S" μm, the feed amount per revolution "S", with which the diamond cutting tool is fed in the groove extended direction while rotating the diamond cutting tool about the axial line, is set to satisfy the following conditional expression:

$$S < 2.9 P^3.$$

12. The grating forming method according to claim 11, wherein the cutting with the diamond cutting tool is performed by a fly cutting working method.

13. The grating forming method according to claim 11, wherein the diamond cutting tool is a single crystal diamond cutting tool.

14. The grating forming method according to claim 11, wherein the blank material is a resin material for producing an optical element.

15. The grating forming method according to claim 11, wherein the blank material on which the fine grating is formed is an amorphous metal material.

16. The grating forming method according to claim 15, wherein the amorphous metal material is an amorphous nickel-phosphorus plated layer.

17. The grating forming method according to claim 11, further comprising using a cutting oil mainly consisting of a vegetable oil when the cutting by the diamond cutting tool is performed.

18. The grating forming method according to claim 11, further comprising:
providing an optical element as the blank material, and
forming a large number of V-shaped grooves in an X-axis direction and a Y-axis direction by the cutting work on the surface of the optical element to form the optical element provided with the anti-reflection surface made of a square pyramid-shaped minute projections.

* * * * *